(12) United States Patent
Creech, Jr.

(10) Patent No.: US 12,507,675 B2
(45) Date of Patent: Dec. 30, 2025

(54) RESTORATION HEIGHT CAP UNIT AND METHOD

(71) Applicant: The Davey Tree Expert Company, Kent, OH (US)

(72) Inventor: Frederick Worth Creech, Jr., Raleigh, NC (US)

(73) Assignee: The Davey Tree Expert Company, Kent, OH (US)

( * ) Notice: Subject to any disclaimer, the term of this patent is extended or adjusted under 35 U.S.C. 154(b) by 0 days.

(21) Appl. No.: 18/925,592

(22) Filed: Oct. 24, 2024

(65) Prior Publication Data

US 2025/0160303 A1 May 22, 2025

Related U.S. Application Data

(60) Provisional application No. 63/601,986, filed on Nov. 22, 2023.

(51) Int. Cl.
| | | |
|---|---|---|
| *A01K 61/77* | (2017.01) | |
| *A01K 61/73* | (2017.01) | |
| *C04B 14/28* | (2006.01) | |
| *E02B 3/04* | (2006.01) | |
| *C04B 111/00* | (2006.01) | |
| *C04B 111/74* | (2006.01) | |

(52) U.S. Cl.
CPC .............. *A01K 61/77* (2017.01); *A01K 61/73* (2017.01); *C04B 14/28* (2013.01); *E02B 3/046* (2013.01); *C04B 2111/00017* (2013.01); *C04B 2111/74* (2013.01)

(58) Field of Classification Search
CPC .......... A01K 61/77; A01K 61/70; E02B 3/046
See application file for complete search history.

(56) References Cited

U.S. PATENT DOCUMENTS

| | | | | |
|---|---|---|---|---|
| 2,069,715 | A * | 2/1937 | Arpin ........................ | E02B 3/06 405/25 |
| 3,704,687 | A * | 12/1972 | Nohmura ............... | A01K 61/70 119/221 |
| 4,028,894 | A * | 6/1977 | Larsen ..................... | E02B 3/12 405/74 |
| 4,154,550 | A * | 5/1979 | Larsen ..................... | E02B 3/12 405/20 |
| 4,669,913 | A * | 6/1987 | Temple ..................... | E02B 3/04 405/15 |
| 5,215,406 | A * | 6/1993 | Hudson ................... | E02B 3/046 119/221 |
| 7,513,711 | B1 * | 4/2009 | Walter .................... | A01K 61/70 |
| 9,403,287 | B2 * | 8/2016 | Hilton ....................... | E02B 7/02 |

(Continued)

FOREIGN PATENT DOCUMENTS

CN 107743905 A * 3/2018 ............. A23K 10/26

*Primary Examiner* — Monica L Perry
(74) *Attorney, Agent, or Firm* — Tucker Ellis LLP (57) ABSTRACT

A restoration cap unit for construction of eco-friendly structures in a body of water is provided, which is constructed from materials including a primarily calcium carbonate material; and a cement that is capable of holding the primarily calcium carbonate material, wherein the restoration cap unit has a first side and a second side which are attached at an edge to form a tent shaped structure, such that the restoration cap unit is configured to be placed on top of an existing restoration assembly to extend the height of the restoration assembly.

20 Claims, 9 Drawing Sheets

(56) References Cited

U.S. PATENT DOCUMENTS

| | | | |
|---|---|---|---|
| 9,744,687 B2* | 8/2017 | Hilton | B28B 1/32 |
| 12,102,067 B1* | 10/2024 | Richardson | A01K 61/73 |
| 2013/0118413 A1* | 5/2013 | Bennett | A01K 61/50 |
| | | | 119/200 |
| 2022/0312746 A1* | 10/2022 | Lv | B28B 11/245 |
| 2024/0011233 A1* | 1/2024 | Creech | E02B 3/14 |

* cited by examiner

RESTORATION HEIGHT CAP UNIT AND METHOD

CROSS REFERENCE TO RELATED APPLICATIONS

The present application is related to, and claims priority to, U.S. Provisional Application Ser. No. 63/601,986, filed Nov. 22, 2023, the contents of which are incorporated herein by reference in their entirety.

BACKGROUND

Field of Invention

The present invention relates to units that are designed to stabilize a shoreline and provide a place for aquatic life to thrive.

Description of Related Art

For wild oyster propagation and construction of artificial reefs, the preferred material is recycled oyster shell. However, there is a shortage of recycled oyster shell. It comes from non-profit, municipal, or private recycling programs, which typically cannot meet the demand for recycled oyster shell. An alternative to recycled oyster shell is quarried rock, such as limestone, marl, or granite. The rock is laid on water bottoms where wild oysters thrive historically. These can be in designated sanctuaries, or actively harvested nurseries. Additionally recycled concrete is used, but the recycled concrete is often contaminated. There has been pushback from government agencies and non-government organizations (NGO) in using the contaminated recycled concrete.

Once an artificial reef is installed, there is often a need to raise the height of the artificial reef. Increasing the height of artificial reefs can serve various purposes, depending on the specific goals and objectives of the reef project. One significant reason for height augmentation is to increase the performance of an existing reef structure to offset increased sea level rise and higher tides. By creating more three-dimensional structure underwater, increased habitat complexity provides additional surfaces and niches for marine organisms to colonize. This, in turn, leads to a more diverse and productive habitat, particularly benefiting fish and other marine species that rely on reefs for shelter, feeding, and reproduction. Taller reefs offer improved habitat for a greater variety of fish species by providing more vertical relief. Fish are often attracted to structures that mimic natural underwater features, and the increased height of reefs can make them more appealing to a wider range of marine life. Beyond ecological benefits, taller reefs can play a role in mitigating coastal erosion and storm damage by attenuating wave energy. This is especially crucial in regions prone to hurricanes, typhoons, or severe weather events. The increased height can also make artificial reefs more visible and accessible for research and monitoring purposes. Researchers find it easier to study ecological dynamics, biodiversity, and reef health when the structure is more accessible and provides a larger surface area for the attachment of monitoring equipment.

Current methods of increasing the height of artificial reefs often lack stability and practicality. One common approach involves the addition of concrete modules or structures onto existing reefs, enhancing vertical relief. However, this method raises concerns about alterations to the natural aesthetics of the reef, potential biofouling, ecological impacts, and stability issues due to the added weight. Another strategy entails mesh cages filled with substrate, though stability and maintenance challenges arise as substrates shift or accumulate debris. Natural coral transplants involve transplanting live coral fragments onto the reef, with success contingent on factors such as species compatibility and environmental conditions. Additionally, floating reef structures aim to increase reef height yet challenges with stability, anchoring, and susceptibility to environmental forces must be carefully addressed. Each of these methods requires meticulous planning, site-specific considerations, and ongoing monitoring to ensure success while minimizing unintended ecological consequences.

SUMMARY

One object of the present invention is to provide an economical solution to construct artificial reefs and other semi-aquatic ecological restoration constructions.

A further object of the present invention is to provide a composition for the restoration cap units, the composition preferably using locally sourced materials and some natural materials.

Another object of the present invention is to provide a method for making the restoration cap units of various sizes according to their construction requirements.

An additional object of the present invention is to provide a height extension to existing or new artificial reefs while maintaining stability.

These and other objects and advantages of the invention, either alone or in combinations thereof, may be satisfied by a restoration cap unit for construction of eco-friendly structures in a body of water comprising: a primarily calcium carbonate material; and a cement that is capable of holding the primarily calcium carbonate material, wherein the restoration cap unit has a first side and a second side, wherein the first side and second side are attached at an edge to form a tent shaped structure, and wherein the restoration cap unit is configured to be placed on top of an existing restoration assembly to extend the height of the restoration assembly.

The foregoing and other features of the application are described below with reference to the drawings.

DETAILED DESCRIPTION

Applicant hereby incorporates by reference in their entireties the following U.S. patent applications: Ser. No. 17/387,220 filed Jul. 28, 2021; Ser. No. 17/702,017 filed Mar. 23, 2022; and Ser. No. 18/470,994 filed Sep. 20, 2023.

The restoration cap unit (10) of the present invention may be made of virgin materials. The restoration cap unit may be sized to any specification, and the ratios of the composite materials may be adjusted to achieve a desired look or consistency. The restoration cap units may be primarily made of calcium carbonate; i.e. marl sand, marl aggregate, oyster shell, and cement. The material that makes up the restoration cap units is preferably local and native to coastal regions, thus making availability and production more efficient. This and other factors result in a better carbon footprint when constructing structures with the restoration cap units. Application of the present invention, restoration cap unit (10), is a practical way to add additional height to artificial reefs or sills or to shoreline stabilization structures. The restoration cap unit (10) can be placed over an existing sill regardless of oyster growth. With great oyster growth, construction components of the artificial reef cannot be adjusted because the components are cemented together. Additionally, the sill is made weaker if the oysters are disturbed.

Figure 1A:
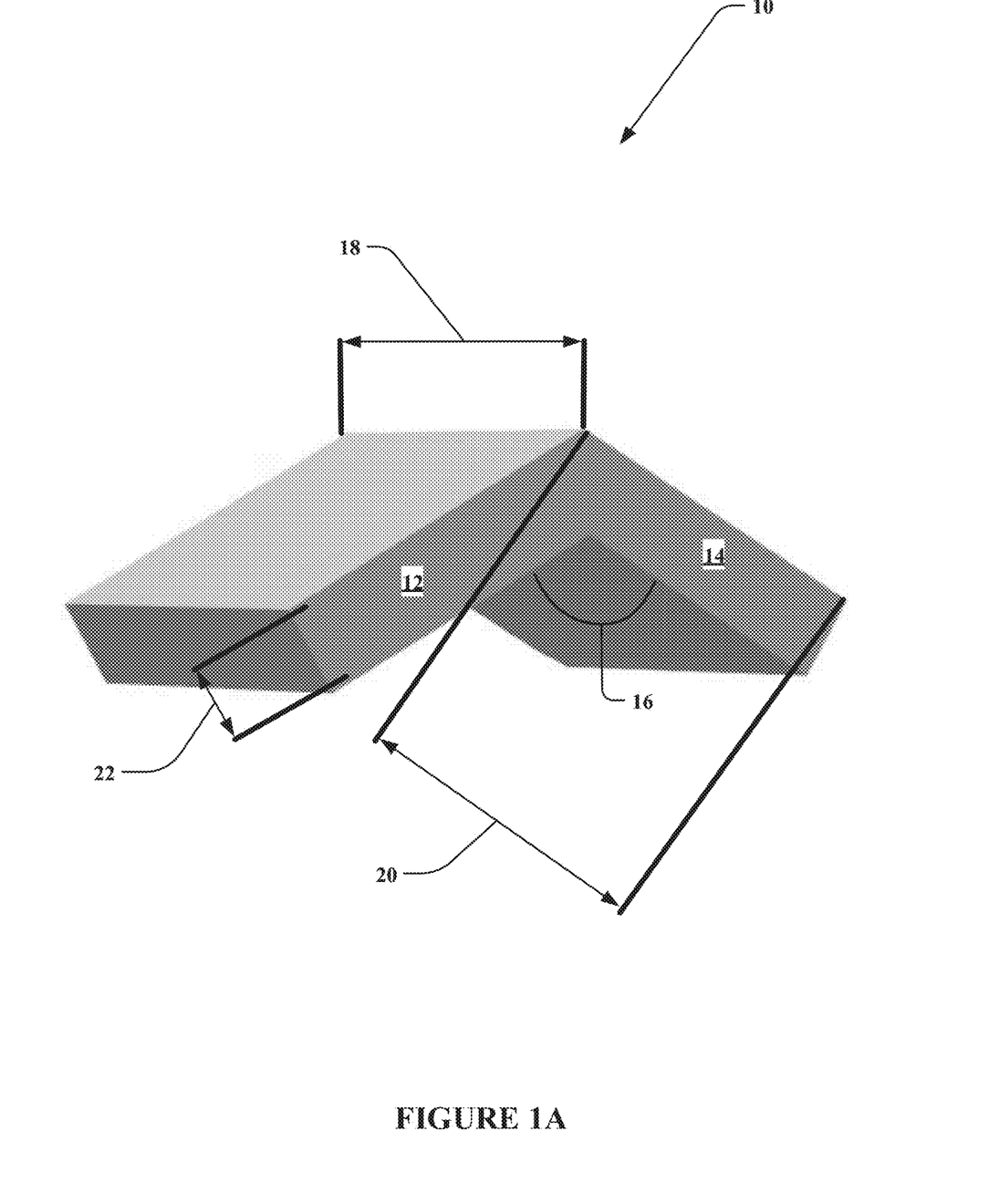
FIGS. 1A and 1B show an embodiment depicting a restoration cap unit.
Figure 1B:
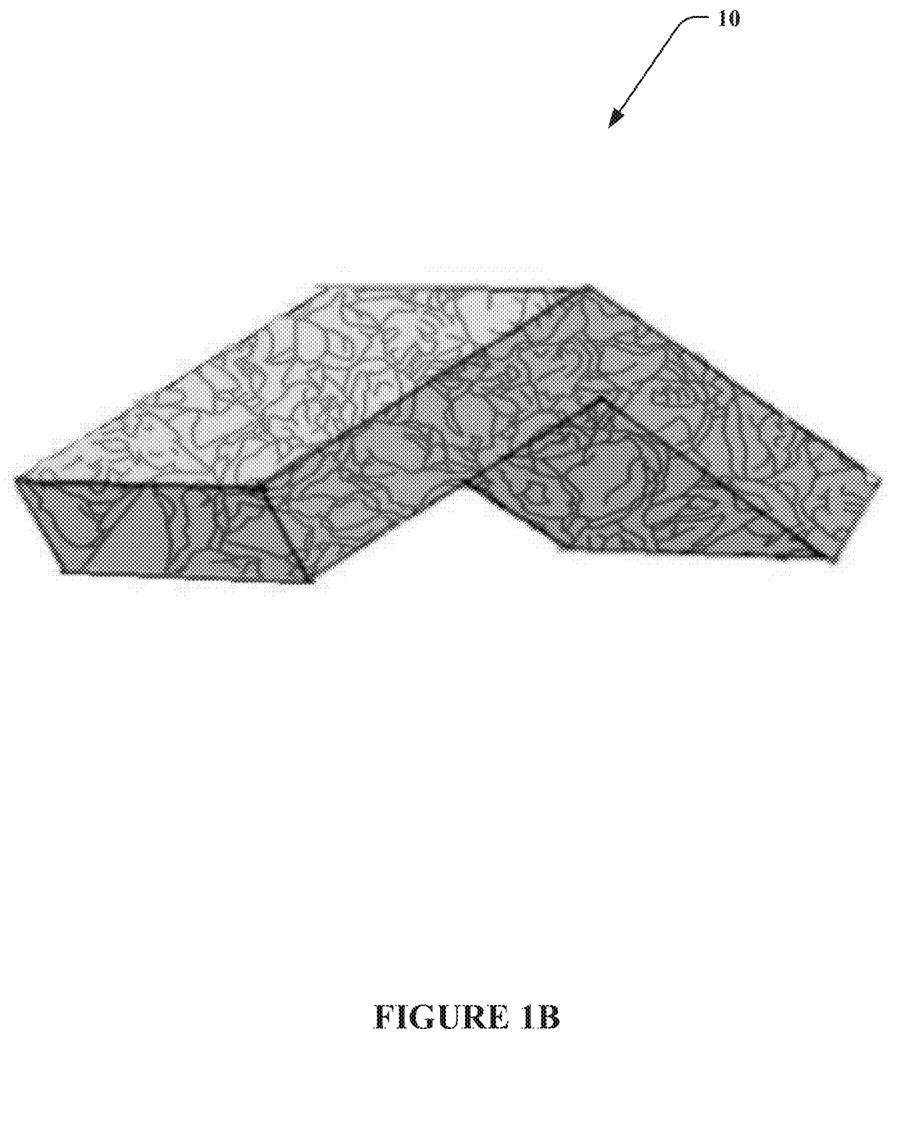
Figure 2A:
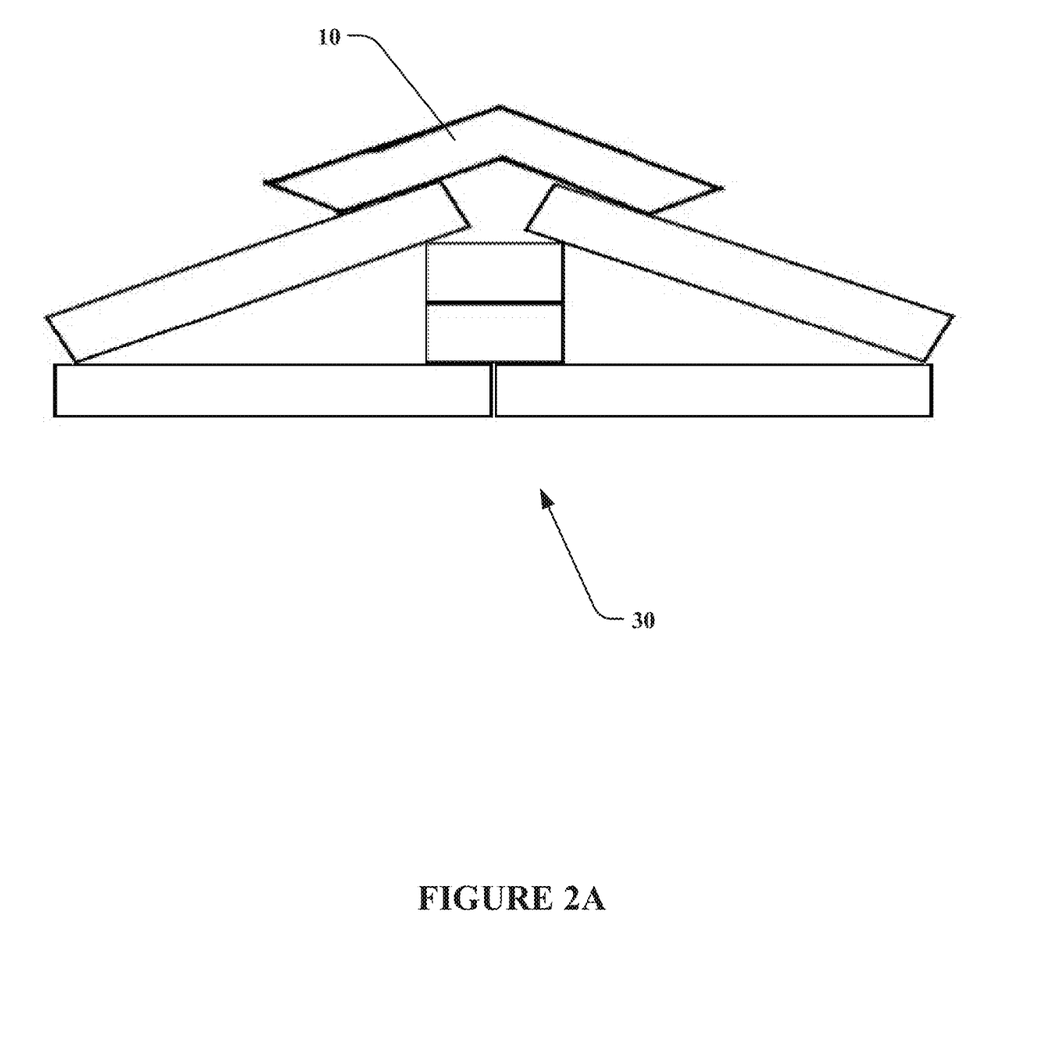
FIG. 2A shows cross-section view of an application of a restoration cap unit on an artificial reef or shoreline stabilization structure.
Figure 2B:
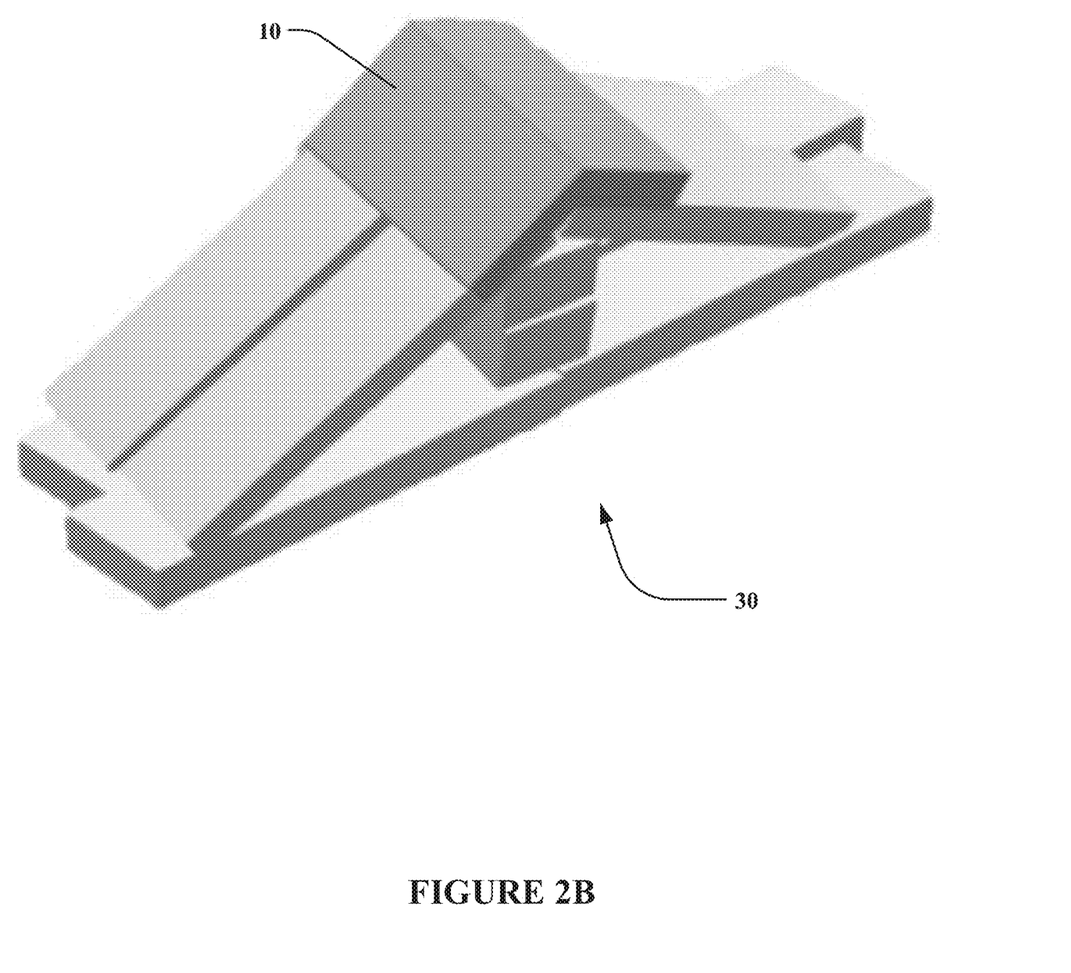
FIG. 2B shows a top perspective view of an application of a restoration cap unit on an artificial reef or shoreline stabilization structure.
Figure 2C:
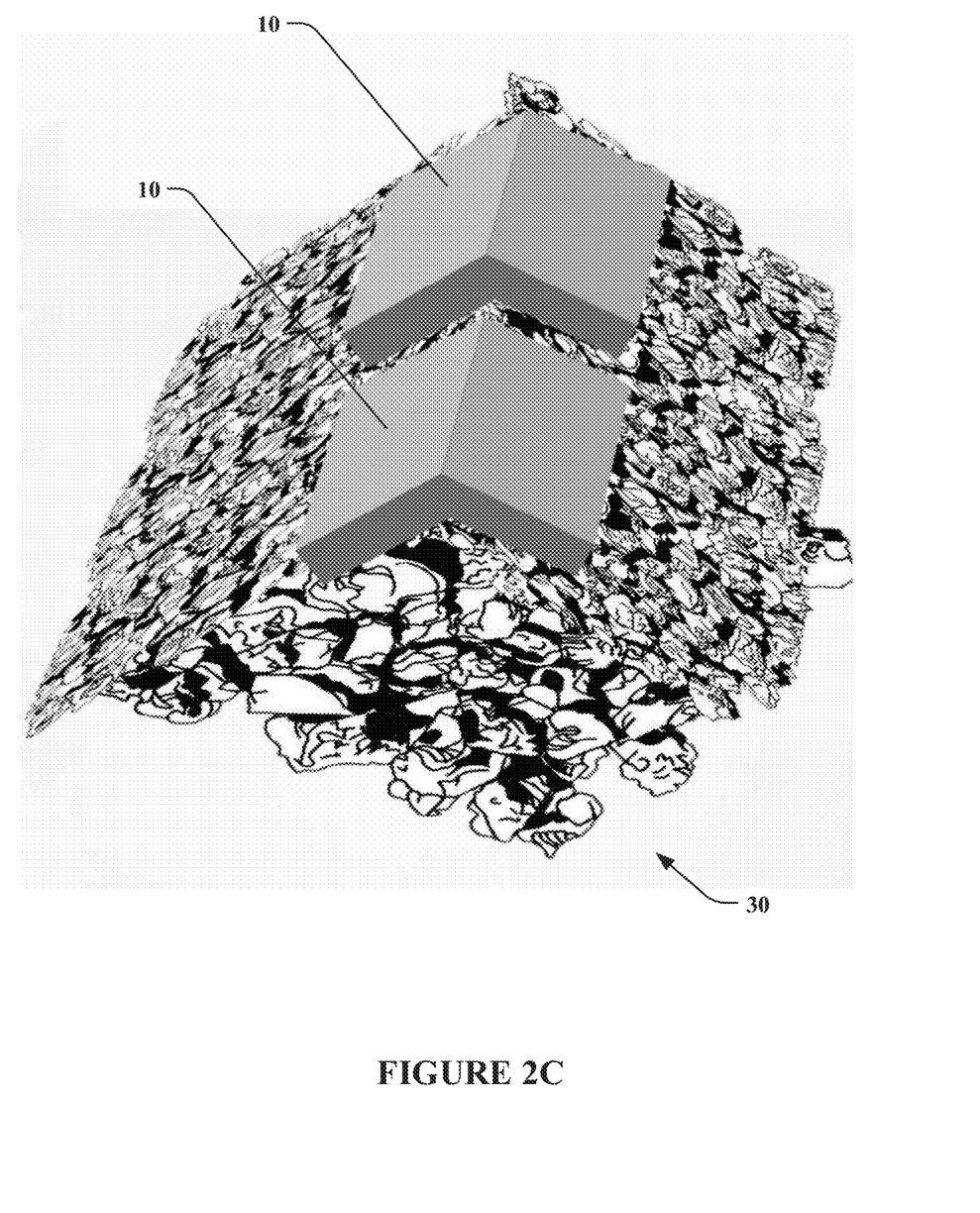
FIG. 2C shows a top perspective view of another application of a restoration cap unit on an artificial reef or shoreline stabilization structure.
Figure 3:
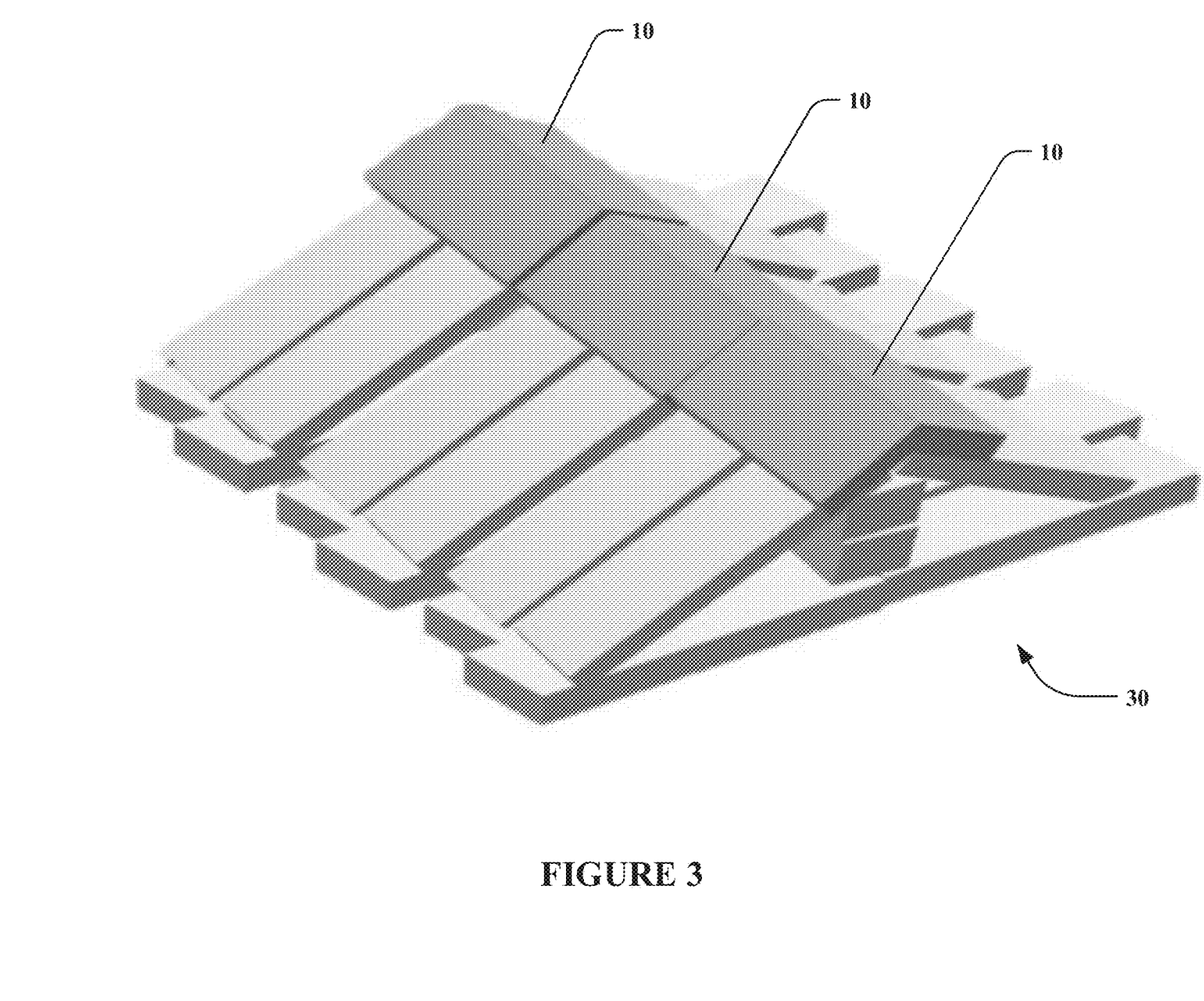
FIG. 3 shows another application of restoration cap units on an artificial reef or shoreline stabilization structure.

As used herein, the term "restoration cap unit" (10) refers to a solid piece of primarily calcium carbonate material held together with cement and in one embodiment, with a bio-cement. FIGS. 1A and 1B show an embodiment, in which restoration cap unit (10) has a tent shaped structure. It should be appreciated that FIG. 1B is shown in a textured pattern representing the primarily calcium carbonate materials. The other figures for clarity will be shown as smooth and flat; however, the restoration cap units (10) and artificial reef components of the following figures also contain primarily calcium carbonate material and are preferably similarly textured in implementation.

The tent shaped structure has a first side (12) and a second side (14) forming angle (16). The restoration cap unit has a length (18), width (20), thickness (22), and a weight. While the restoration cap units (10) can be any size, the dimensions of the restoration cap unit (10) will range from an angle (16) of 125 degrees to 135 degrees, a length (18) of 18 inches to 96 inches, preferably 18 inches to 36 inches, a width (20) of 12 inches to 24 inches, a thickness (22) of 3 inches to 6 inches, and a weight of 75 pounds to 800 pounds, preferably 75 pounds to 200 pounds. The range of degrees for the angle (16) creates a gradual slope that is preferred for the restoration cap unit (10).

As used herein, the term "primarily calcium carbonate material" refers to rocks, clays, minerals, and, in certain embodiments, once living material from a living organism that produces portions of the organism that are primarily made up of calcium carbonate. Examples are limestone, marble, chalk, marl sand, marl aggregate, bird eggshells, and aquatic products. Included in aquatic products and aquatic shells are oysters, seashells, snail shells, pearls, coral, tufa, and the like. A collection of these materials is treated with cement in a slab form to produce a slab of the material, once the cement dries.

As used herein, the term "cement" refers to any biocompatible material, which can be used to hold the primarily calcium carbonate material together in a slab form and be resistant to wave action, storms, and the like. An example includes, but is not limited to, portland cement. In one embodiment, the cement is a bio-cement compatible with the primarily calcium carbonate material, which has the capability of supporting growth on the slab formation by the primarily calcium carbonate material and cement. An example includes quicklime made from oyster shells.

As used herein, the term "slab" refers to a solid piece of primarily calcium carbonate material held together with cement and in one embodiment, with a bio-cement. In one embodiment, the slab has a generally rectangular shape, though any shape is contemplated. The slab may be molded into a tent shaped structure. There may be two slabs, a first side (12) and a second side (14) cemented together to create a tent shaped structure.

FIGS. 2A, 2B, 2C, and 3 show applications of a restoration cap unit (10) on an artificial reef (30). The restoration cap unit (10) may be placed atop an artificial reef (30) thus extending the overall height of the artificial reef (30). The construction of the artificial reef may be any mounded or pyramidal shape. The restoration cap unit (10) may be segmented into several restoration cap units (10) and applied across the top of a lengthy artificial reef (30). The use of segmented restoration cap units (10) improves practicability of the placement of the restoration cap units (10) atop the artificial reef (30), particularly by limiting the weight of any individual segment of restoration cap unit (10) for ease of handling and placement. The restoration cap units (10) may be placed in the designated area by any desired method, including but not limited to, by hand, lifting by a crane to place in the designated area, particularly for heavier installations, or pushing into place by a backhoe loader, placed over the side of a floating barge or other vessel, or the like.

Figure 4:
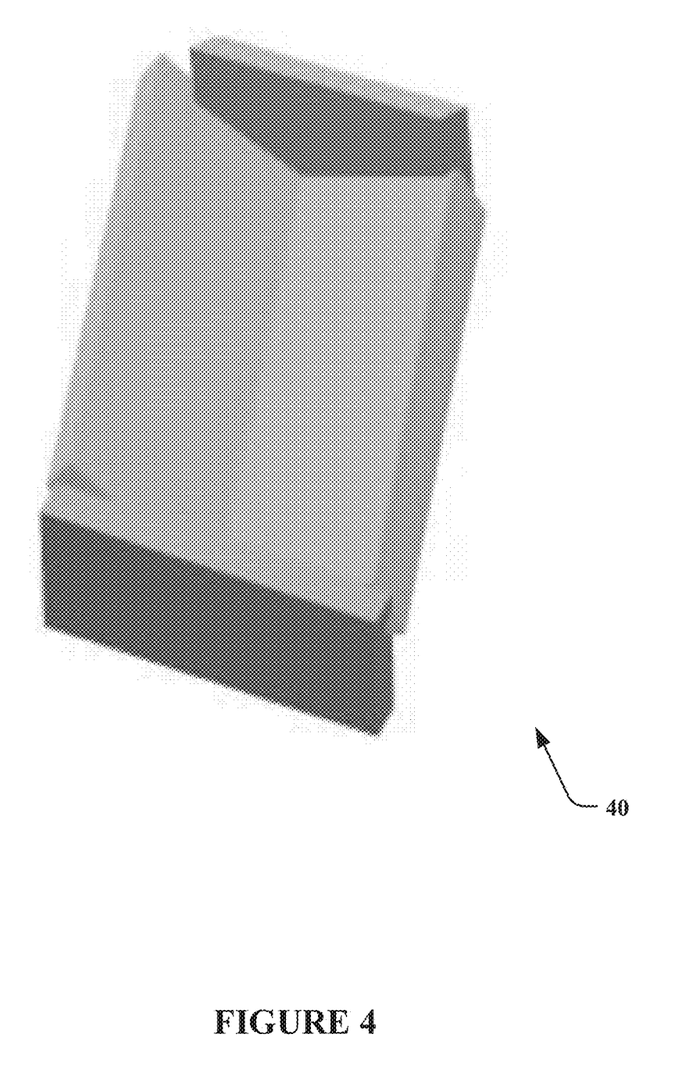
FIG. 4 shows an embodiment of a restoration cap unit mold.
Figure 5:
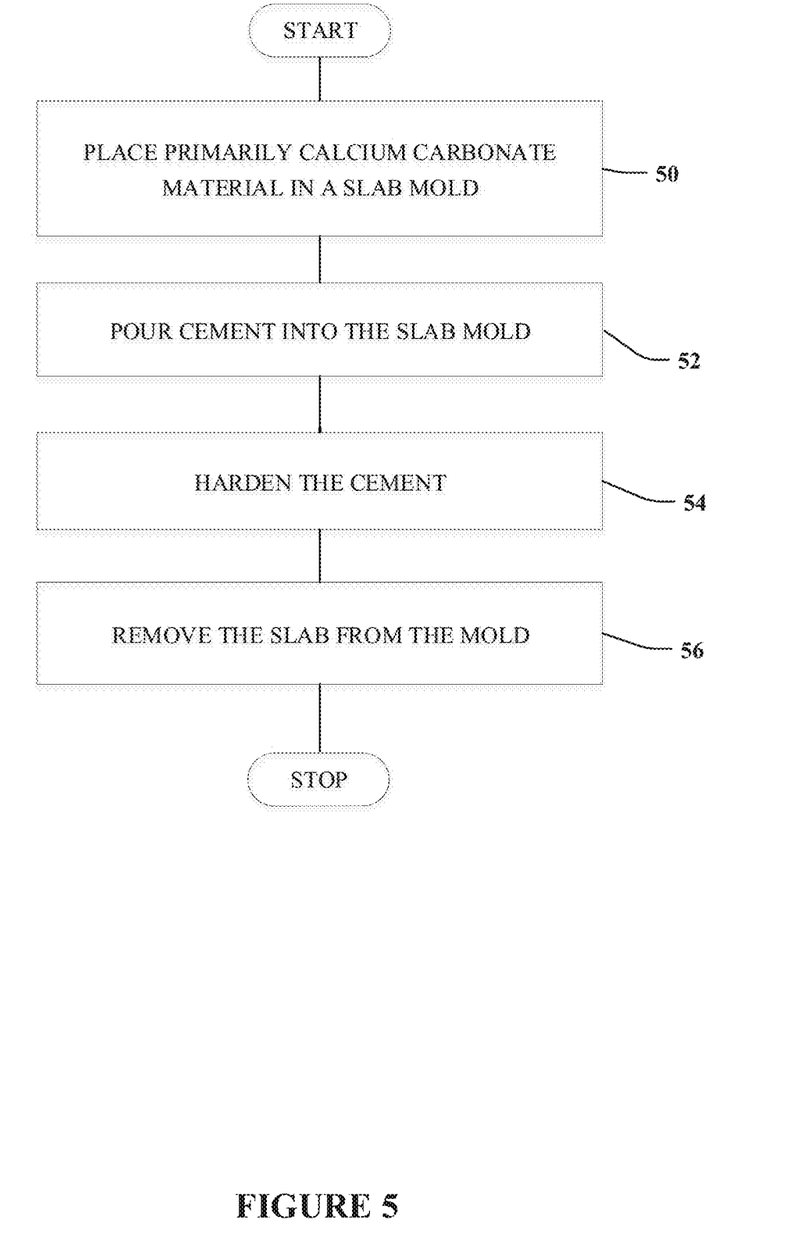
FIG. 5 shows a flowchart depicting a method of making a restoration cap unit of embodiments of the present invention.
Figure 6:
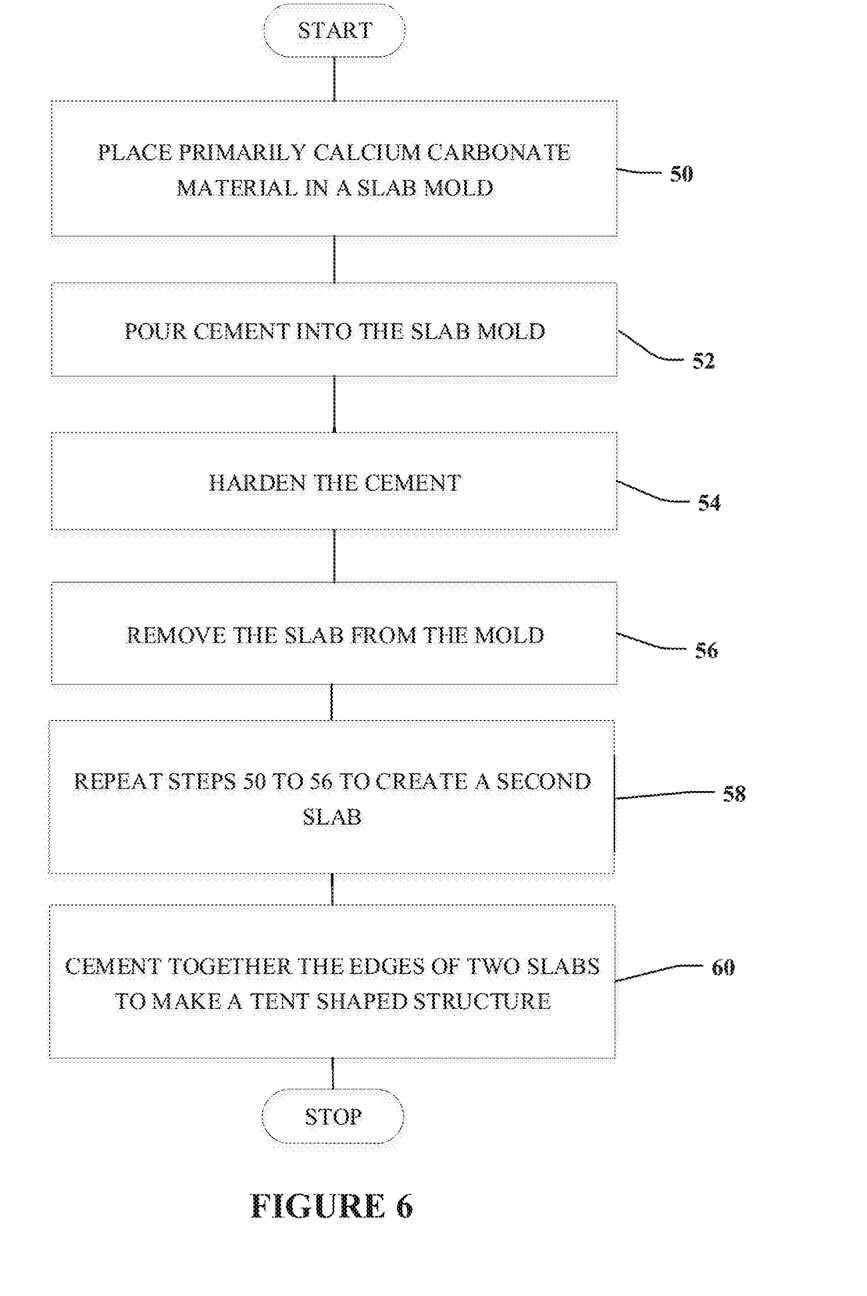
FIG. 6 shows a flowchart depicting another method of making a restoration cap unit of embodiments of the present invention.

FIG. 4 shows an embodiment of a restoration cap unit mold and FIGS. 5 and 6 show flowcharts depicting a methods of making a restoration cap unit (10) of the present invention. It may be appreciated by those skilled in the art that alternative methods of preparation can also be used. In one embodiment of the present invention, a plurality of primarily calcium carbonate material, such as oyster shells, is placed in a tent shaped mold structure (40), (50). Next, a cement or a bio-cement is poured into the mold (40), (52). In an alternative embodiment, marl sand or marl aggregates may be mixed in the cement and poured in the mold structure (40) without oyster shells. When the slab hardens (54), the slab can be removed from the mold structure (40), (56) after the cement cures and the slab transported to storage or to the installation site. In an alternative embodiment, a rectangular-shaped mold structure may be used. After the slab hardens (56), two slabs may be created (58), and cemented together at the edges (60) to create the restoration cap unit (10) of the invention. These restoration cap units (10) with the oyster shells may have rougher jagged or textured surfaces, while the restoration cap units without oyster shells may be smoother.

The following is a non-exhaustive listing of embodiments of the present invention:

Embodiment 1. A restoration cap unit for construction of eco-friendly structures in a body of water comprising:
  a) a primarily calcium carbonate material; and
  b) a cement that is capable of holding the primarily calcium carbonate material;
  wherein the restoration cap unit has a first side and a second side, wherein the first side and second side are attached at an edge to form a tent shaped structure, wherein the restoration cap unit is configured to be placed on top of an existing restoration assembly to extend the height of the restoration assembly.

Embodiment 2. The restoration cap unit according to Embodiment 1, wherein the primarily calcium carbonate material is obtained from once living material from an organism.

Embodiment 3. The restoration cap unit according to Embodiment 1 or Embodiment 2, wherein the primarily calcium carbonate material comprises aquatic shells.

Embodiment 4. The restoration cap unit according to any one of Embodiments 1-3, wherein the cement is a bio-cement.

Embodiment 5. The restoration cap unit according to any one of Embodiments 1-4, wherein the first side and second side are attached at an edge at an angle of 125 to 135 degrees.

Embodiment 6. The restoration cap unit according to any one of Embodiments 1-5, wherein the first side and the second side each, independently, has a thickness ranging from 3 inches to 6 inches.

Embodiment 7. The restoration cap unit according to any one of Embodiments 1-6, wherein the first side and the second side each, independently, has a width measured from the edge where the first and second side join to an edge at a bottom of the first side or second side ranging from 12 inches to 24 inches.

Embodiment 8. The restoration cap unit according to any one of Embodiments 1-7, wherein the restoration cap unit has a length measured along the edge where the first side and second side join ranging from 18 inches to 36 inches.

Embodiment 9. The restoration cap unit according to any one of Embodiments 1-8, wherein the first side and the second side each, independently, has a weight ranging from 75 pounds to 200 pounds.

Embodiment 10. The restoration cap unit according to any one of Embodiments 1-9, wherein the restoration assembly is a member selected from the group consisting of shoreline stabilization structures, artificial reef structures, and revetment structures.

Embodiment 11. A method of making the restoration cap unit according to any one of Embodiments 1-10 comprising:
 a) providing a plurality of primarily calcium carbonate material;
 b) placing the primarily calcium carbonate material in a slab mold structure; and
 c) pouring the cement into the slab mold in a sufficient amount that when the cement hardens the slab can be removed from the mold
 wherein the restoration cap unit has a first side and a second side, wherein the first side and second side are attached at an edge to form a tent shaped structure, wherein the restoration cap unit is configured to be placed on top of an existing restoration assembly to extend the height of the restoration assembly.

Embodiment 12. The method according to Embodiment 11, wherein the primarily calcium carbonate material is obtained from once living material from an organism.

Embodiment 13. The method according to Embodiment 11 or Embodiment 12, wherein the primarily calcium carbonate material is aquatic shells.

Embodiment 14. The method according to any one of Embodiments 11-13, wherein the cement is a bio-cement.

Embodiment 15. The method according to any one of Embodiments 11-14, wherein the first side and second side are attached at an edge at an angle of 125 to 135 degrees.

Embodiment 16. The method according to any one of Embodiments 11-15, wherein the first side and second side each, independently has a thickness ranging from 3 inches to 6 inches.

Embodiment 17. The method according to any one of Embodiments 11-16, wherein the first side and second side each, independently, has a length ranging from 18 inches to 96 inches.

Embodiment 18. The method according to any one of Embodiments 11-17, wherein the first side and second side each, independently, has a width ranging from 12 inches to 24 inches.

Embodiment 19. The method according to any one of Embodiments 11-18, wherein the restoration cap unit has a weight ranging from 75 pounds to 800 pounds.

Embodiment 20. The method according to any one of Embodiments 11-19, wherein the restoration cap unit is made by fusing together an edge of a first slab and an edge of a second slab to form a tent-shape.

Embodiment 21. The method according to any one of Embodiments 11-20, wherein the restoration cap unit is made from a single tent-shaped mold.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials, and the like apparent to those skilled in the art still fall within the scope of the invention as claimed by the applicant.

What is claimed is:

1. A restoration cap unit for construction of eco-friendly structures in a body of water comprising:
 a) a primarily calcium carbonate material; and
 b) a cement that is capable of holding the primarily calcium carbonate material;
 wherein the restoration cap unit has a first rectangular side and a second rectangular side, wherein the first rectangular side and second rectangular side are attached along a long edge thereof forming a tent shaped structure, wherein the restoration cap unit is configured to be placed on top of an existing restoration assembly to extend the height of the existing restoration assembly.

2. The restoration cap unit according to claim 1, wherein the primarily calcium carbonate material comprises once living material from an organism.

3. The restoration cap unit according to claim 1, wherein the primarily calcium carbonate material comprises aquatic shells.

4. The restoration cap unit according to claim 1, wherein the cement is a bio-cement.

5. The restoration cap unit according to claim 1, wherein the first rectangular side and second rectangular side are attached at an edge at an angle of 125 to 135 degrees.

6. The restoration cap unit according to claim 1, wherein the first rectangular side and the second rectangular side each, independently, has a thickness ranging from 3 inches to 6 inches.

7. The restoration cap unit according to claim 1, wherein the first rectangular side and the second rectangular side each, independently, has a width measured from the long edge where the first rectangular side and second rectangular side join to an edge at a bottom of the first rectangular side or second rectangular side ranging from 12 inches to 24 inches.

8. The restoration cap unit according to claim 1, wherein the restoration cap unit has a length measured along the long edge where the first rectangular side and second rectangular side join ranging from 18 inches to 36 inches.

9. The restoration cap unit according to claim 1, wherein the first rectangular side and the second rectangular side each, independently, has a weight ranging from 75 pounds to 200 pounds.

10. A method of making the restoration cap unit according to claim 1 comprising:
   a) providing a plurality of the primarily calcium carbonate material;
   b) placing the primarily calcium carbonate material in a slab mold structure; and
   c) pouring the cement into the slab mold in a sufficient amount that when the cement hardens the slab can be removed from the mold wherein the restoration cap unit has a first rectangular side and a second rectangular side, wherein the first rectangular side and second rectangular side are attached along a long edge forming the tent shaped structure, wherein the restoration cap unit is configured to be placed on top of the existing restoration assembly to extend the height of the existing restoration assembly.

11. The method according to claim 10, wherein the primarily calcium carbonate material comprises once living material from an organism.

12. The method according to claim 10, wherein the primarily calcium carbonate material is aquatic shells.

13. The method according to claim 10, wherein the cement is a bio-cement.

14. The method according to claim 10, wherein the first rectangular side and second rectangular side are attached at the long edge at an angle of 125 to 135 degrees.

15. The method according to claim 10, wherein the first rectangular side and second rectangular side each, independently has a thickness ranging from 3 inches to 6 inches.

16. The method according to claim 10, wherein the first rectangular side and second rectangular side each, independently has a length ranging from 18 inches to 96 inches.

17. The method according to claim 10, wherein the first rectangular side and second rectangular side each, independently has a width ranging from 12 inches to 24 inches.

18. The method according to claim 10, wherein the restoration cap unit has a weight ranging from 75 pounds to 800 pounds.

19. The method according to claim 10, wherein the restoration cap unit is made by fusing together a long edge of a first slab and a long edge of a second slab to form the tent-shaped structure.

20. The method according to claim 10, wherein the restoration cap unit is made from a single tent-shaped mold.

* * * * *